Nov. 23, 1948.  H. R. COHN  2,454,632
EDUCATIONAL DEVICE
Filed Feb. 19, 1946  3 Sheets-Sheet 1

INVENTOR
HOWARD R. COHN
BY
Ridsdale Ellis
ATTORNEY

Nov. 23, 1948. H. R. COHN 2,454,632
EDUCATIONAL DEVICE
Filed Feb. 19, 1946 3 Sheets-Sheet 2

INVENTOR
HOWARD R. COHN
BY
Ridsdale Ellis
ATTORNEY

Nov. 23, 1948.  H. R. COHN  2,454,632
EDUCATIONAL DEVICE
Filed Feb. 19, 1946  3 Sheets-Sheet 3

INVENTOR
HOWARD R. COHN
BY Ridsdale Ellis
ATTORNEY

Patented Nov. 23, 1948

2,454,632

UNITED STATES PATENT OFFICE 2,454,632

EDUCATIONAL DEVICE

Howard R. Cohn, Brooklyn, N. Y.

Application February 19, 1946, Serial No. 648,657

5 Claims. (Cl. 35—35)

This invention relates to devices for teaching children their letters, the term letters being used to include not only the letters of the alphabet but also the numerals.

The primary object is to provide means by which children can learn their letters by both eye and hand. They learn to draw the letters at the same time that they learn to recognize them by form or outline.

Another important object is to provide means whereby, while learning the order of the letters of the alphabet by sight, they have the correct order impressed on their minds by hand placing of the letters in proper sequence.

Learning wholly by sight or hearing gives no opportunity for a child to indulge its desire for action. By introducing the element of action, either by drawing the letters or by placing letter blocks in correct order, an element of play is introduced which holds the child's interest. Further, the greater the number of different sets of association, the more readily are facts assimilated and the more firmly are they retained in the mind.

One suitable form of construction is shown in the drawings, wherein:

Fig. 7 is a plan view of the alphabet and numeral board used in positioning the letters and numerals.

The usual alphabet blocks are solid cubes with the letters printed or painted on their faces. The blocks shown here are given the outline of the letters to make their form more readily learnt and remembered. Further, they retain their identity in spite of rough usage which might remove printing or painting.

Midway between the inner and outer margins of the letters is a slot 10 through which a pencil may be inserted for the purpose of drawing the letters on a drawing pad 15 placed under them. The letters are thick primarily to permit the slot 10 to be bevelled and made much wider at the top than at the bottom. A child does not coordinate well so that a wide-mouthed slot is a great help to it in placing the end of the pencil or crayon in the slot. On the other hand, as the bottom of the slot is narrow the pencil point is guided efficiently with the result that a smooth, well-formed letter is produced on the pad.

Figure 1:
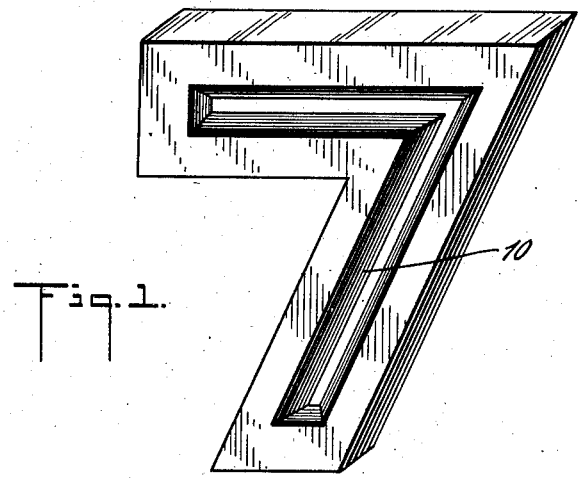
Fig. 1 is a perspective view of a numeral constructed in accordance with the present invention.
Figure 2:
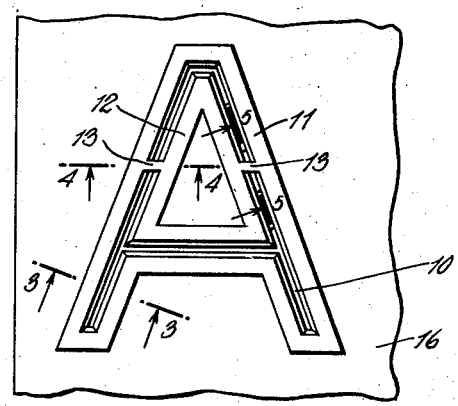
Fig. 2 is a plan view of a letter and the corresponding part of the alphabet and numeral board used in positioning the letters and numerals.

Some of the letters, viz.: A, B, D, O, P, Q, and R are closed with the result that a continuous slot would sever the inside part of the letter hereinafter termed the "island," from the outside part. This is shown clearly in Fig. 2 where the outside part of the letter is designated as 11 and the inside part or "island" as 12. In the ordinary stencil plate used in painting letters on boxes, etc., the "island" problem is met by interrupting the outlines of the letters at one or more points to leave a portion or portions of the stencil plate between such parts intact.

Figure 5:
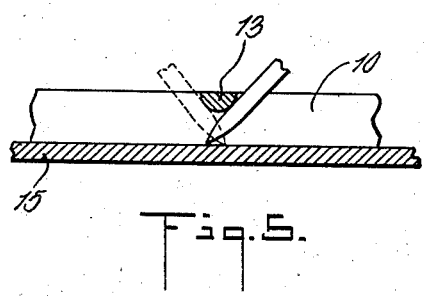
Fig. 5 is a section on the line 5—5 of Fig. 2 with a drawing tablet in place of the alphabet and numeral board.
Figure 6:
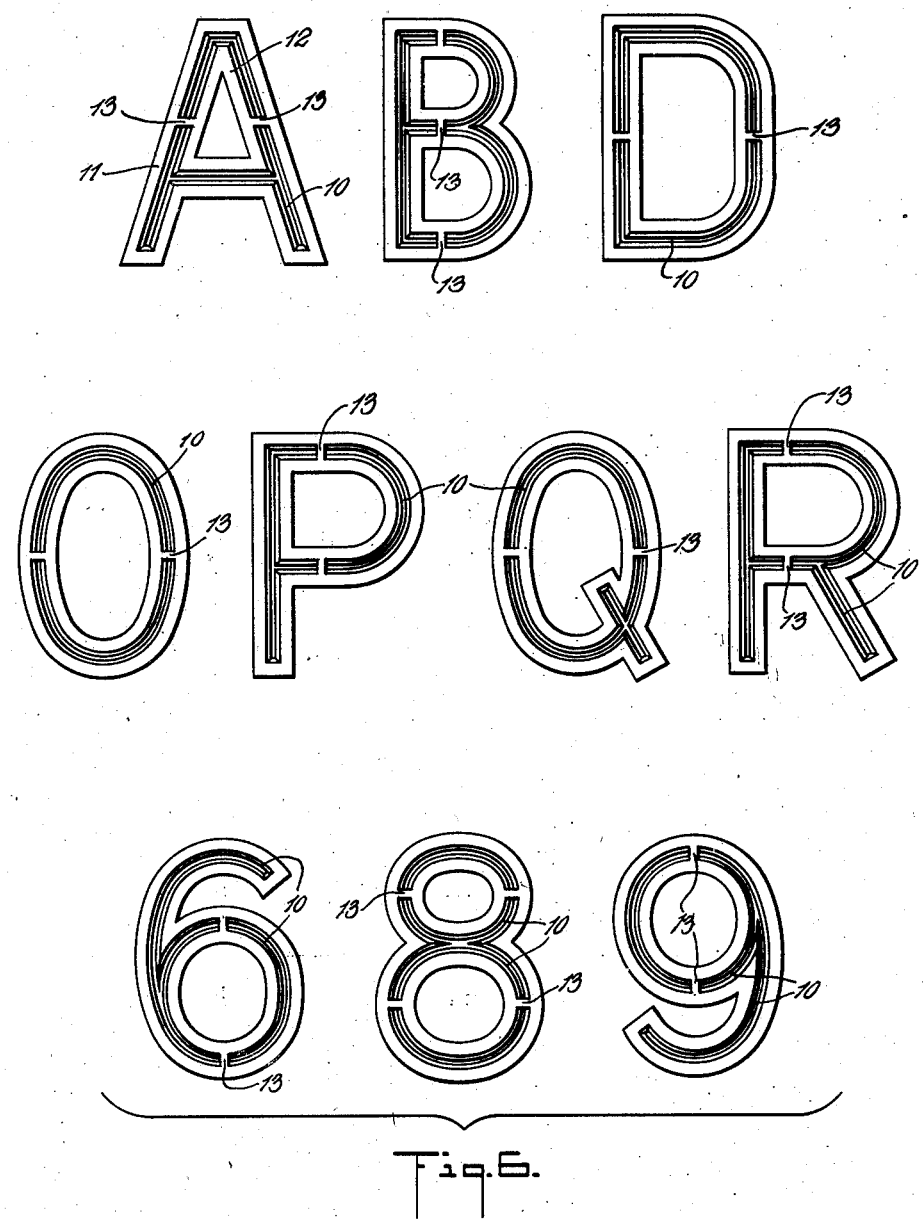
Fig. 6 shows in plan those letters and numerals having "islands"
Figure 2:
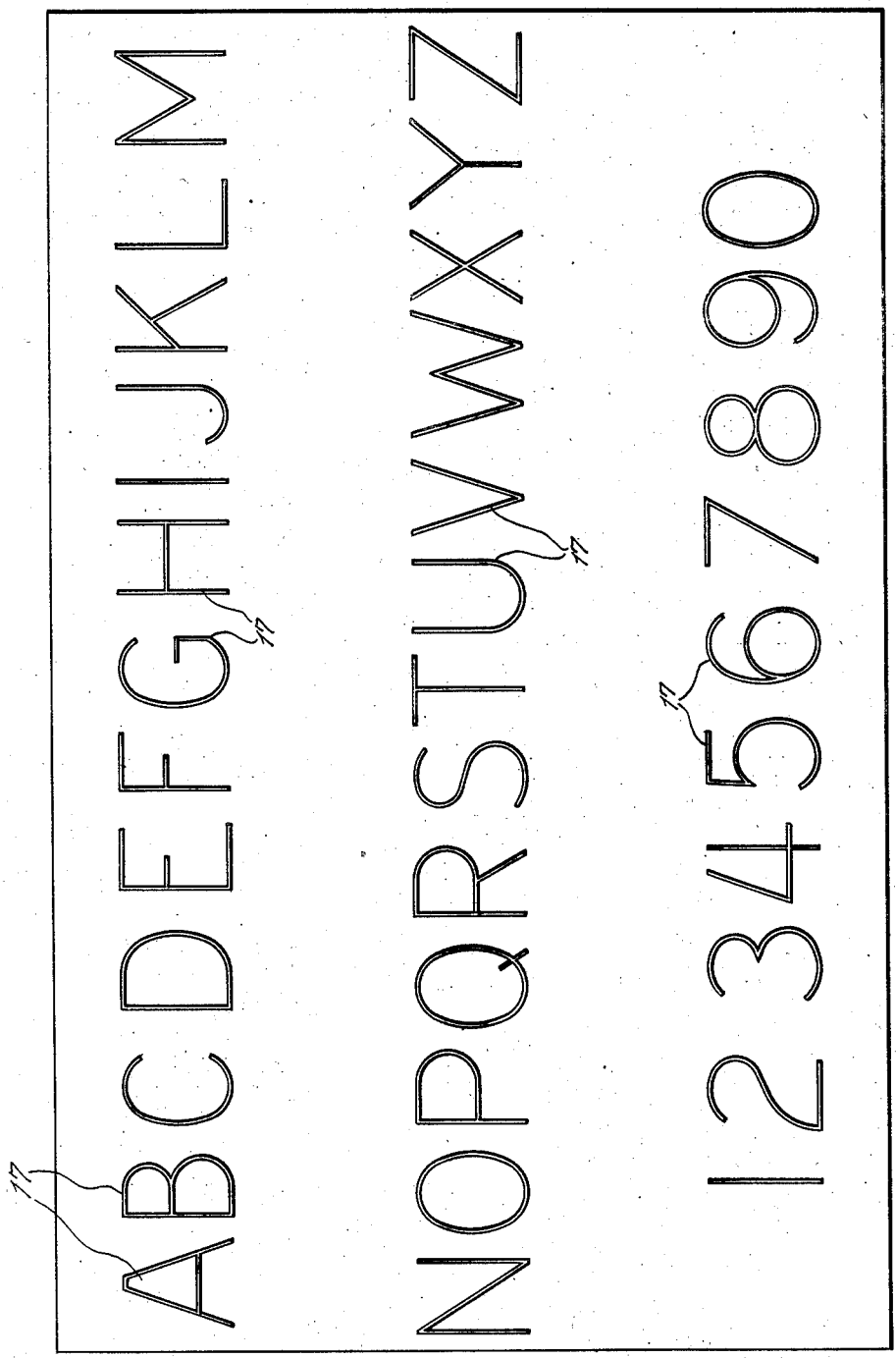

According to the present invention the connecting portion or portions takes the form of a bridge or bridges 13 across the upper part only of the slots. This leaves the lower parts of the slots continuous and enables the pencil point to be inserted under the bridge, as shown in Fig. 5. Consequently complete letters can be traced without first removing the block and then supplying missing portions later, as is required with the ordinary stencil.

Figure 3:
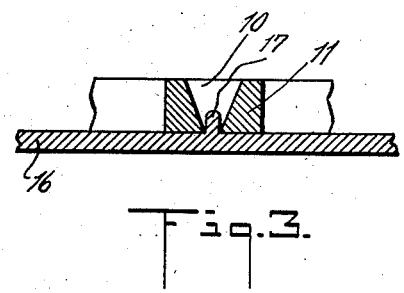
Fig. 3 is a section on the line 3—3 of Fig. 2.
Figure 4:
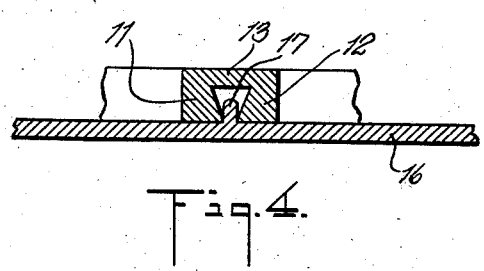
Fig. 4 is a section on the line 4—4 of Fig. 2.

Recognition of the letters and ability to form them is part only of the knowledge a child must acquire. He must also learn the order in which they come. To do this a board 16 is provided on which is arranged the full alphabet and set of numerals all in proper sequence. Each letter or numeral 17 consists of a raised ridge of the same contour as but slightly narrower than the bottom of the slot in the corresponding letter or numeral block. Each block, therefore, can be brought into engagement, as shown, in Fig. 3, with its corresponding raised letter on the board and will be held in place while the other letters are being positioned. It will be noted that as the "islands" are connected to the outer parts of the letters by bridges, the raised letters can be made continuous. Further, as the raised letters fit the slots, they are of the same shape and size as the letters the child makes with the blocks and a pencil.

Various materials may be used for forming the blocks although to advantage they are made of colored plastic. The raised letters of the alphabet board should preferably be of material of different color to the body of the board to make the letters stand out clearly.

What I claim is:

1. An educational device comprising a series of individual letter blocks with margins corresponding to the form of the letter and provided midway between such margins with a slot to enable the letter to be traced by a pencil on a sheet of paper underneath the block.

2. An educational device comprising a series of individual letter blocks each with margins corresponding to the form of the letter and provided midway between such margins with a slot of V-shaped cross-section to enable the letter to be traced by a pencil on a sheet of paper underneath the block, the block being considerably thicker than the width of the slot at the bottom so that, by bevelling the walls of the slot, the width of the slot at the top is made much greater than the width of the slot at the bottom.

3. An educational device comprising a series of individual letter blocks each with margins corresponding to the form of the letter and provided midway between such margins with a slot to enable the letter to be traced by a pencil on a sheet of paper underneath the block, the blocks for letters with "islands" each having a bridge to connect the "island" with the other parts of the block, the upper part of the bridge being flush with the top of the block while the block is sufficiently thick to permit the lower part of the bridge to be cut away so that the slot at the bottom is continuous and the pencil can be inserted under the bridge to complete the letter.

4. An educational device comprising a series of individual letter blocks with margins corresponding to the form of the letter and provided midway between such margins with a slot also in the form of the letter and a board with raised letters arranged thereon in alphabetical order the upstanding ridges forming the letters each having the same configuration and having a width slightly less than that of the bottom of the slot in the corresponding individual block whereby each block may be brought into register with its corresponding letter on the board and retained in place while the other blocks are being similarly positioned.

5. An educational device comprising a series of individual letter blocks each of substantial thickness with margins corresponding to the form of the letter and provided midway between such margins with a slot of V-shaped cross-section to enable the letter to be traced by a pencil on a sheet of paper underneath the block and a board with raised letters arranged thereon in alphabetical order, the upstanding ridges forming the letters each having the same configuration as and having a width slightly less than that of the bottom of the slot in the corresponding individual block whereby each block may be brought into register with its corresponding letter on the board and retained in place while the other blocks are being similarly positioned.

HOWARD R. COHN.

REFERENCES CITED

The following references are of record in the file of this patent:

UNITED STATES PATENTS

| Number | Name | Date |
| --- | --- | --- |
| 148,291 | Fowler | Mar. 10, 1874 |
| 364,845 | Oakley | June 14, 1887 |
| 1,136,663 | Fox | Apr. 20, 1915 |
| 1,275,997 | Adler | Aug. 20, 1918 |
| 1,396,379 | Moore | Nov. 8, 1921 |
| 1,493,485 | Faust | May 13, 1924 |
| 2,277,329 | Kimbrough | Mar. 24, 1942 |